Oct. 17, 1944.　　　L. G. HILKEMEIER　　　2,360,344
CONCRETE MIXER WATER SUPPLY SYSTEM
Filed March 2, 1942　　　2 Sheets-Sheet 1
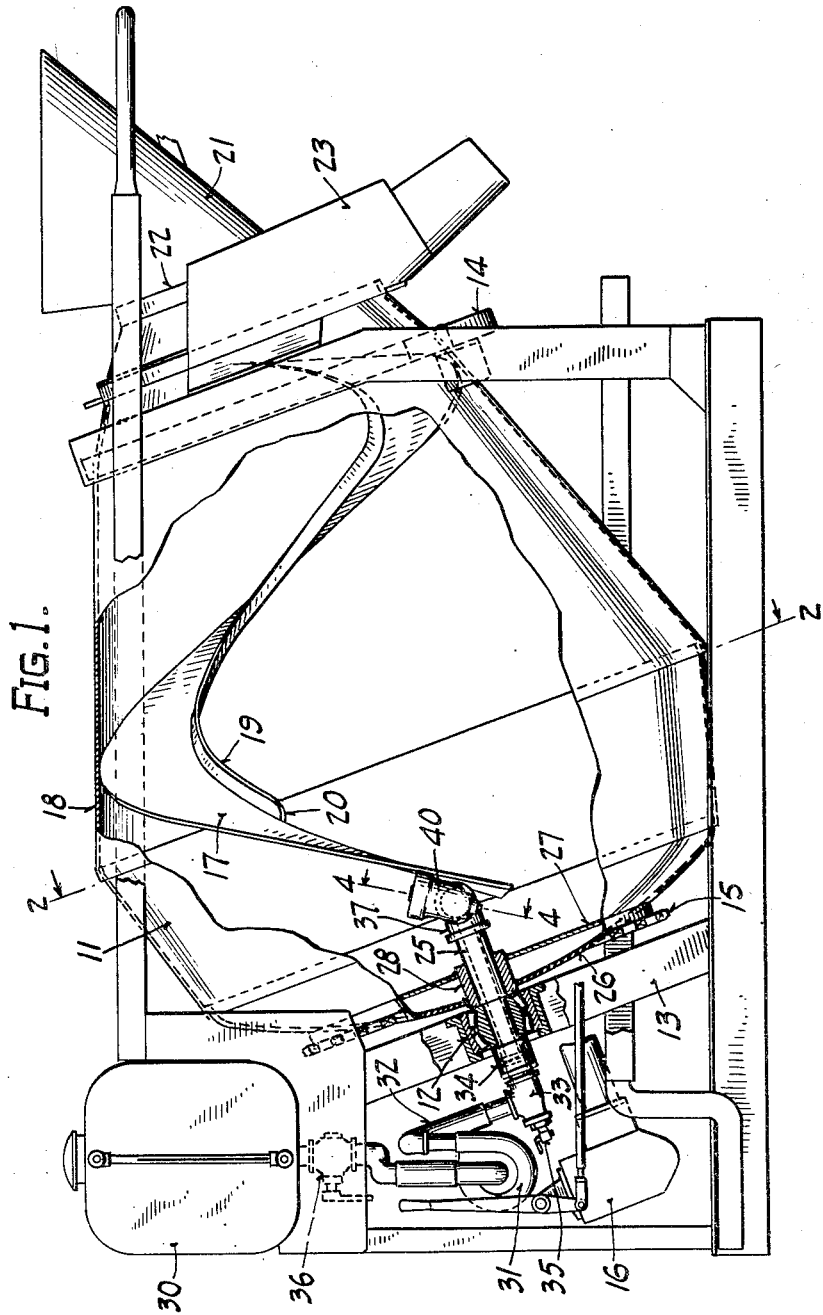
Louis G. Hilkemeier
INVENTOR.
BY George H. Evans
ATTORNEY.

Oct. 17, 1944.   L. G. HILKEMEIER   2,360,344
CONCRETE MIXER WATER SUPPLY SYSTEM
Filed March 2, 1942      2 Sheets-Sheet 2
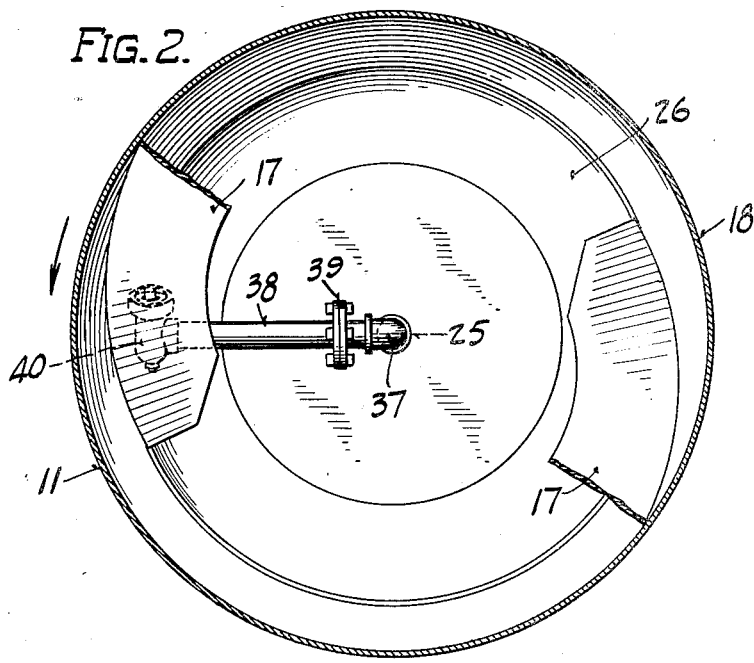
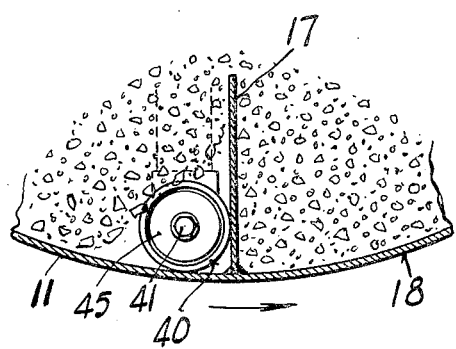
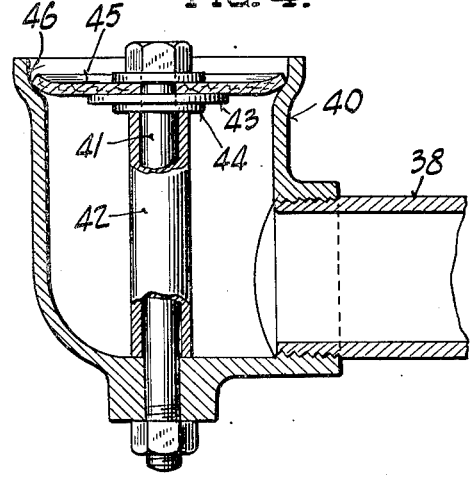
Louis G. Hilkemeier
INVENTOR.
BY George A. Evans
ATTORNEY.

Patented Oct. 17, 1944

2,360,344

UNITED STATES PATENT OFFICE 2,360,344

CONCRETE MIXER WATER SUPPLY SYSTEM

Louis G. Hilkemeier, West Allis, Wis., assignor to Chain Belt Company, Milwaukee, Wis., a corporation of Wisconsin Application March 2, 1942, Serial No. 432,933

5 Claims. (Cl. 259—168)

This invention relates to mechanism for introducing water into concrete mixers whereby the rapid hydration of the cement content of the concrete-making constituents may be facilitated. The invention finds particular utility in transit concrete mixers, for in such mixers the bladed mixing drum is normally charged with an amount of dry aggregates and cement occupying well over half of the volume of the drum. When such mixing drums are mounted for rotation about an inclined axis, as in those truckmixers having a high end discharge, the materials may occupy substantially the entire cross sectional area of the lower portion of the drum, in which event it becomes more difficult to so introduce the water into the dry materials that, upon agitation by the drum blades, a plastic concrete mixture of the desired consistency may be produced within reasonable time limits.

While in some cases it is possible to charge the water into the drum concurrently with the introduction of the dry materials and thereby obtain some mixing during charging and consequently, reduction of the size of the batch, and in still other cases to obtain similar results by introducing water into the drum prior to charging of dry materials, neither of these procedures can be universally followed, for in many instances good practices may require that water be introduced a limited period of time prior to pouring of the mixed concrete, in which event the length of the haul by the transit mixer may require that water not be introduced until all of the dry materials are charged into the drum and part, at least, of the transportation trip consumed. In this latter case, the problem is one of introducing water into a space which is nearly entirely occupied with the dry constituents of the concrete, and then so agitating the water and the dry constituents that the desired concrete mixture can be effectively produced.

The problem is still further accentuated where the water content is reduced in order to produce what is known as "low slump" concrete. Where the batches are relatively "wet" the introduction of a large quantity of water, as is used with such batches, enables the production of water-cement paste in much shorter time, and unevenness in the plasticity of the batch can be overcome, in most instances by adequate working of the materials. Where only a small amount of water is used, however, it is much more difficult to disperse the water throughout the materials so as to hydrate the cement particles, as is necessary before the batch becomes plastic. In fact, where extra large batches are being produced in a mixer of the inclined axis type, it has been practically impossible with water systems heretofore used to produce "low slump" concrete within commercially acceptable time requirements.

It is an object of the present invention to provide an improved system for introducing water into such mixing drums whereby the difficulties heretofore encountered may be largely overcome and the time required for adequate mixing lessened an appreciable extent.

Heretofore attempts have been made to introduce water into the lower portion of such inclined axis machines at a point somewhat near the center of rotation of the drums, and beneath the mass of materials which accumulates at this end of the drum. This has not been satisfactory because the water stays in the center of the mass, and the whole body of material appears to revolve in a differential manner with respect to the drum, the cement constituents packing around the outside of the body and apparently sealing the water within the material. Blade action is ineffective under such conditions, for the blades cannot disrupt the mass, the blades appearing to make creases in this compacted body rather than tearing the body apart.

In one of its primary aspects, the present invention resides in the discovery that by introducing the water adjacent the side wall of the spirally bladed drum and preferably in a position closely contiguous to, but behind, the drum blade, the water may, upon rotation of the drum, be caused to follow a tortuous path along the drum wall and behind the blade through the cavity produced by the revolving blade or blades, and therefore packing of the cement with the other materials is effectively prevented. This initial action apparently produces considerable wetness longitudinally of the drum and obviates that type of differential movement of the material with respect to the drum which prevents mixing, whereby the blades are enabled to plow into the material and produce a tumbling action such as is conducive to rapid mixing of the batch.

Furthermore, introduction of water in accordance with this aspect of the present invention appears to be facilitated by the very factor which retards mixing, namely the tendency of the material to stick together as a body in the drum and not to move relative thereto except in a differential manner. For this tendency, which in its most pronounced form occurs in the high discharge machines carrying large loads, also causes the material to shrink away from the back side of the blade at least while the latter is rising, thereby producing a space through which the water may flow longitudinally of the drum and in a manner enabling the blades to produce end to end mixing of the materials.

With the foregoing objects in mind, the invention resides in the novel combination, arrangement and disposition of eliminating as hereinafter described and pointed out in the appended claims.

Reference is now made to the accompanying drawings illustrating a preferred embodiment of the invention, in a truck mixer of the inclined axis type, in which said drawings:

Figure 1 is a side elevation, partly broken away, showing a transit concrete mixer having a water supply system in accordance with the present invention;

Figure 2 is a section taken on the line 2—2 of Figure 1;

Figure 3 is a sectional view taken at right angles to the mixer blade showing the disposition of the water outlet with respect thereto; and Figure 4 is a section through the water nozzle taken on the line 4—4 of Figure 1.

In the drawings, the numeral 11, designates the mixing drum which is shown mounted for rotation about an inclined axis, the forward end of said drum being supported in an axially disposed bearing 12, mounted on the mixer frame 13. The rear end of the drum is supported on a pair of rollers 14, also mounted on the frame. Rotation of the drum is effected by a transmission, preferably a chain drive, engaging a sprocket 15, mounted on the forward end of the drum, said transmission being driven through gear reduction unit 16, connected to a suitable source of power. The method of mounting the drum as well as drum transmissions of the type illustrated, are well known in the art and the arrangement here shown is merely by way of illustration.

The interior of the drum is provided with one or more spirally arranged mixing blades 17, which extend inwardly from the side walls 18, of the drum. Blades 17, are provided with a flange or lip 19, along their inner edge, which lip extends toward the rear end of the drum and preferably forms an angle slightly more than 90 degrees with the blade. Lip 19 and blade 17 thereby form a trough with the side wall 18 of the drum so that during rotation of the drum, the material can to some extent be retained and propelled longitudinally of the drum. As herein illustrated lip 19 is shown facing the discharge end of the drum since it is intended that the machine will be rotated so as to produce movement of the material in that direction during mixing. It should be noted that the lip 19 does not extend for the full length of the blade but terminates as at 20, a short distance from the forward end of the blade.

The machine illustrated is also provided with a charging hopper 21, arranged to feed material into an axial opening 22, at the rear of the drum, said feed hopper being movable into a position cooperating with the opening for charging materials, and also being movable out of such a position to permit discharge of the mixed concrete from the drum into a receiving chute 23. The precise method of mounting this hopper is not shown in detail as a variety of such means are now well known to those who are familiar with the art to which this invention appertains. It should be sufficient to point out that upon rotation of the drum in one direction material charged through hopper 21, is moved forward in the drum by blades 17, and by rotation of the drum in the other direction the blades propel the material rearwardly to the discharge opening 22. As previously indicated, it is my preference that the machine is rotated in the discharge direction during the mixing as well as during discharge, but my invention is not limited to this method, for successful results can be obtained regardless of which way the drum is rotated for mixing provided the water outlet is properly disposed relative to the mixing elements.

For introducing water into the drum, I provide an axially arranged pipe 25, which extends through the forward, closed head 26 of the drum, said pipe being of sufficient section to also constitute a trunnion for bearing 12, previously mentioned. The inner side of drum head 26 may be provided with an annular member 27 which fits against the head and has its inner periphery welded to a sleeve 28 enclosing pipe 25, which sleeve is also secured to the drum head, thereby providing a reinforced structure for supporting the forward end of the drum. With this pipe and bearing arrangement water may be supplied from a source external to the drum through the closed head to an outlet point inside the drum.

The water supply system external to the drum comprises a water tank 30 communicating with a water pump 31, the latter forcing the water under pressure through an outlet pipe 32 to a T fitting 33, mounted at the outer end of pipe 25. A suitable packing gland 34 is inserted between pipe 25 and fitting 33, since pipe 25 rotates with drum 11, whereas fitting 33 is stationary. Drain valve 35 is provided at the forward end of the fitting 33, and a valve 36 may well be provided in the line leading from the water tank to the pump.

Within the drum, pipe 25, extends a short distance beyond the false head or annular member 27, and the end of the pipe is provided with an elbow fitting 37, threaded to a radial pipe 38, directed toward a periphery of the drum. This pipe 38, which is preferably made in two sections for purposes of assembly and disassembly, with a flanged connection 39 for the two parts, has at its outer end a water discharge nozzle 40, the details of which are best illustrated in Figure 4. This nozzle is generally shaped as an elbow attachment to the end of the pipe 38, causing the water to flow in a direction at right angles to pipe 38. Concentrically of the direction of flow in nozzle 40, is a bolt 41, which extends through an opening in the back of the nozzle, which bolt has mounted on it a spacing sleeve 42, the latter furnishing a backing for washers 43 and 44, which in turn support all but the peripheral portion of the rubber gasket 45, which seats in a recess 46 provided in the outlet. When water is applied under pressure from within the nozzle, the gasket may be flexed and the water can flow into the drum. The primary purpose for gasket or diaphragm 45 is to prevent concrete from entering the bell-shaped nozzle, and when water is not being forced through the nozzle, the gasket seats against the recess 46, thereby providing an effective seal against the entrance of extraneous material.

In Figure 2, of the drawings, there is illustrated a section taken at right angles to the axis showing the preferred directions for rotating the drum during mixing. In this view, outlet 40 is seen behind blade 17, the direction of rotation being such that material is moved toward the discharge end of the drum. Should the drum be designed for rotation in the opposite direction for mixing, the outlet should be disposed on the opposite side of the blade so that it may always be behind the blade during the predetermined mixing direction. Furthermore, outlet 40 is preferably directed parallel to the blade and pointing in a direction to the rear of the drum, as is best illustrated in Figure 1, in order that the water expelled from the outlet may more naturally follow the path of the blade 17.

As previously indicated, water pipe 38 is arranged to rotate with the drum, but rather than swing the outlet pipe from the central supply tube 25, it is preferred that the outlet be supported adjacent its outer, radial extremity, a suitable method for accomplishing which may reside in welding the side of the nozzle to either the back edge of blade 17 or to the drum wall 18. In Figure 3, the outlet bell 40 is shown contacting both the back side of the blade and the side of the drum where it may be securely attached to either, or to both, as by welding. In this manner, the nozzle is not freely suspended from the supply pipe, nor is it swung by the supply pipe, but rather it is an integral part of the drum structure, and it may revolve with the drum without putting a strain on the radially disposed pipe 38.

By employing pressure to the water system, as by means of centrifugal pump 31, any variation in head produced by the eccentric disposition of the outlet 40 is substantially nullified, especially since the pump connection is considerably lower than elbow 37 due to the inclination of the pump axis. Consequently water discharge is effected by pressure rather than variation in head, and gravity flow is not relied upon.

While the water system illustrated can be used advantageously under nearly all conditions of loading, its most pronounced advantages appear to exhibit themselves when very large batches are being handled and when the water content is low. When such large batches are being handled, occupying in preshrunk condition as much as 75% of the drum volume, the aggregate and cement may well cover the entire lower head of the drum.

With the improved water system illustrated herein, water is introduced near the lower end of the drum at a point adjacent the peripheral walls and preferably just behind a mixing blade. As such a blade rises up through the material, there is a tendency for the material to shrink away from the rearward side of the blade, thereby providing a space through which the water may readily flow along the drum wall, rearwardly of the drum. In Figure 3, the disposition of the water outlet with respect to this space is diagrammatically illustrated, the extent of the shrinkage depending of course, upon the conditions of the mix.

By adequately wetting the materials adjacent to drum walls for a distance longitudinally of the drum, scouring action is produced between the drum and its contents and the blades are enabled to shear the material and produce the necessary tumbling action to cause formation of concrete. Consequently, rotation of the drum in a direction to produce perimetal propulsion of the materials, rearwardly toward the discharge end is highly desirable, for the portions engaged by the blade are sufficiently plastic to move longitudinally as well as rotatively, and when received into the free upper part of the drum may cascade from the blades back into the central, lower end of the drum. Furthermore, bodily rotation of all the materials and packing of the cement around the body is overcome by the water system here disclosed.

In this connection, lip 19 appears to furnish a desirable function, for while this lip tends to confine the material and cause it to follow a tortuous path adjacent the drum wall, the lip is set at slightly greater than 90 degrees to its supporting blade, thereby forming an obtuse angle (of approximately 120°) which enables material to slide off the blade and to clean itself preparatory to engaging another portion of material.

The present system has been successfully employed not only with large batches, but also where the water content of such batches has been carefully limited to produce as little as one half or even one quarter inch slump. Whereas under former practice it was almost impossible to mix such batches, at least within reasonable time, the present invention enabled suitable mixing to be accomplished in quite moderate time. Moreover there is little tendency for the material to pack against the drum head, or for unmixed portions of such material to disintegrate as "balls" during discharge.

While only one form of the invention has been illustrated, it will be clear that various modifications may be made without departing from the spirit of the invention. For instance, instead of one outlet a plurality of such outlets might be employed depending upon their size and the number of mixing blades, etc. Accordingly the invention is not intended to be limited except as required by the following claims.

I claim:

1. In a concrete mixer having a rotatable drum provided with a spirally arranged blade attached to the inner side walls of said drum adapted to produce agitation of the concrete-making materials upon rotation of the drum in a predetermined direction for mixing, a water supply system comprising a discharge nozzle disposed adjacent a side wall of said drum and in close proximity to and substantially parallel with the rearward side of said spirally arranged blade, a central supply pipe communicating with a source of water supply external to said drum, and a lateral pipe connecting said nozzle and said central supply pipe, said system being rotatable with said drum and supplying water to a point adjacent the wall of the drum where it may produce effective hydration of the cement constituents by flowing in the path of said blade circumferentially and longitudinally of the drum.

2. In a concrete mixer having a rotatable mixing drum with a closed head at one end and a spirally arranged blade attached to the inner side wall of the drum extending for substantially the entire length thereof, said blade and said wall forming a spiral pocket about the inner periphery of said drum for propelling concrete-making materials during rotation of the drum in its mixing direction, a drum-mounted water supply system comprising a central supply pipe and a branch arm associated therewith having an outlet disposed adjacent the closed end of the drum, said outlet introducing water in proximity to, but rearward of, the aforesaid blade and causing the water to flow from said outlet longitudinally of the drum through the space provided by the shrinking of materials from behind the mixing blade as said blade rises through the materials.

3. In a concrete mixer, a rotatable mixing drum, a spirally arranged mixing blade secured to and extending substantially the full length of the inner side wall of said drum, a water supply system rotatable with said drum and comprising a central supply pipe, a lateral arm extending radially from said pipe to the periphery of the drum at a point in close proximity to the rearward side of said blade and adjacent to one end of the drum, and a water discharge member secured to the end of said arm disposed to direct water parallel to said blade into the space provided by the shrinking of concrete-making materials away from the rearward face of said blade during rotation of the drum for mixing of said materials.

4. In a concrete mixer drum rotatable about an axis of fixed inclination to the horizontal and having a closed lower end adapted to be largely covered by concrete-making materials, a radially offset, substantially spiral, mixing blade extending longitudinally from adjacent the closed end of the drum, arranged to propel perimetral portions of the material rotatively and longitudinally of the drum axis and behind which blade an open space is provided during drum rotation due to shrinkage of the material from the rear face of said blade, and a nozzle disposed to introduce water directly into said space.

5. In a concrete mixer having a mixer drum rotatable about a fixed, inclined axis and a closed lower head against which the concrete-making material tends to crowd and pack, a spirally arranged mixing blade extending inwardly from the side wall of the drum adapted to produce a shearing action of the materials in the lower portion of said drum, and a water supply system having a discharge outlet supported by said drum wall arranged to introduce water at a point behind said blade and in proximity to the closed head of the drum, said outlet pointing in a direction away from said closed head and parallel to said spiral blade.

LOUIS G. HILKEMEIER.